No. 666,753. Patented Jan. 29, 1901.
W. L. HAMILTON.
CENTERING TOOL.
(Application filed May 25, 1900.)
(No Model.)
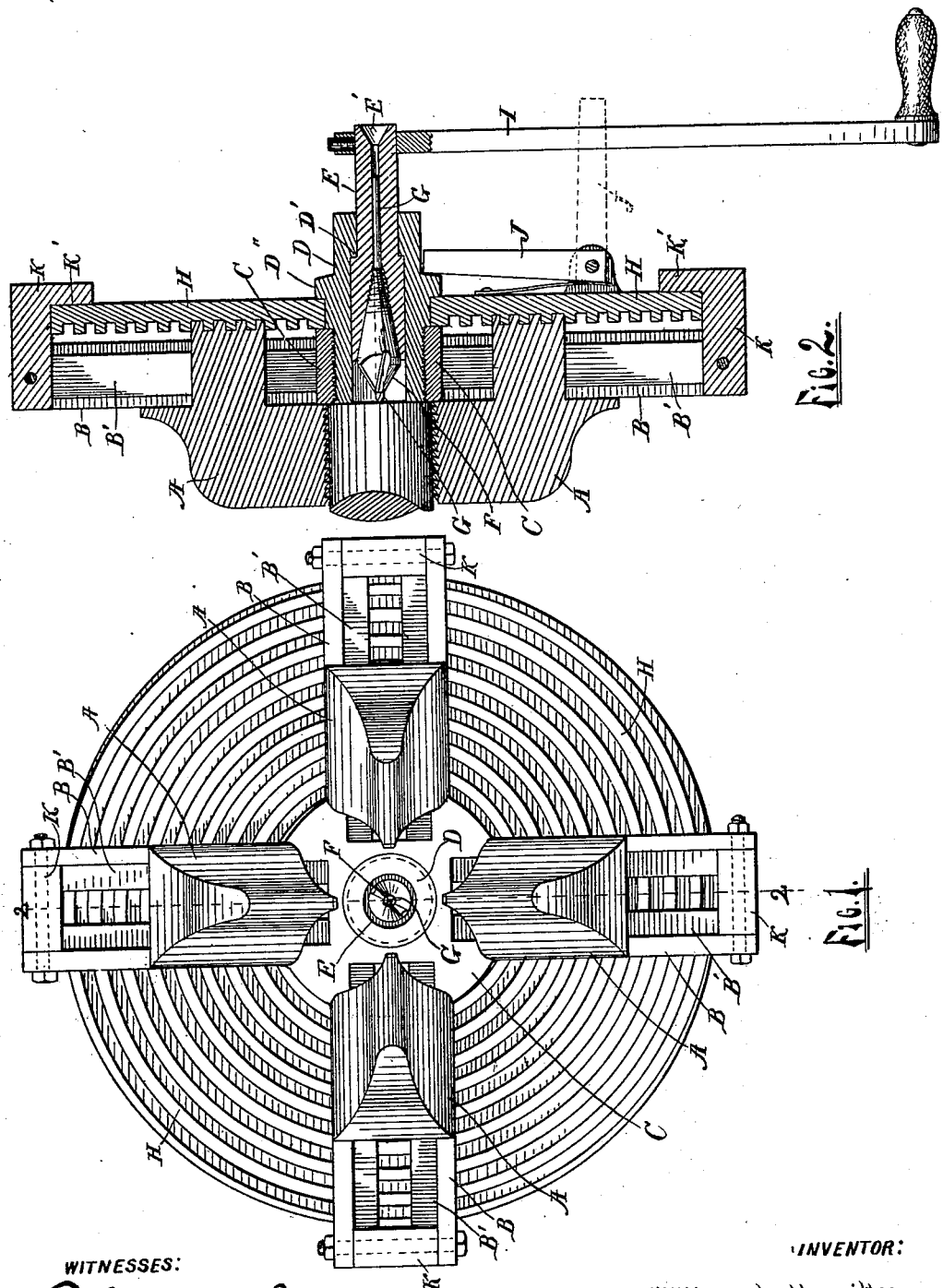
WITNESSES:
Palmer A. Jones.
Miles V. Easterly.
INVENTOR:
William L. Hamilton.
By Luther V. Moulton
Attorney
THE NORRIS PETERS CO., PHOTO-LITHO., WASHINGTON, D. C.

UNITED STATES PATENT OFFICE.

WILLIAM L. HAMILTON, OF BANGOR, MICHIGAN.

CENTERING-TOOL.

SPECIFICATION forming part of Letters Patent No. 666,753, dated January 29, 1901.

Application filed May 25, 1900. Serial No. 17,967. (No model.)

*To all whom it may concern:*

Be it known that I, WILLIAM L. HAMILTON, a citizen of the United States, residing at Bangor, in the county of Van Buren and State of Michigan, have invented certain new and useful Improvements in Centering-Tools; and I do hereby declare the following to be a full, clear, and exact description of the invention, such as will enable others skilled in the art to which it appertains to make and use the same.

My invention relates to improvements in tools for forming lathe-centers in work to be turned in a lathe; and its object is to produce a suitable tool that may be readily operated, either in a lathe or by hand, and to provide the same with certain new and useful features hereinafter more fully described, and particularly pointed out in the claims.

My device consists, essentially, of a centering-chuck to engage the end of the work and having in its axis a suitable sleeve, in which sleeve is rotatively mounted a boring and countersinking tool provided with a suitable countersink at one end for the lathe-center and having a handle attached to rotate the same by hand and means for connecting the said handle with the chuck-disk to operate the same, as hereinafter more fully described, reference being had to the accompanying drawings, in which—

Figure 1 is an elevation of a device embodying my invention, and Fig. 2 a vertical section of the same on the line 2 2 of Fig. 1.

Like letters refer to like parts in both of the figures.

A represents a series of jaws radially movable in the respective arms B, radiating from the hub C and provided with suitable ways B', traversed by the jaws A, said jaws being operated by means of a rotative disk H, having a suitable involute projection engaging suitable teeth on the back of the jaws A. Said disk is rotatively mounted on a sleeve D, inserted in the axis of the hub C and provided with a suitable collar D'' to engage the back of the disk H.

K represents blocks on the ends of the arms, removable for the purpose of permitting the insertion of the jaws A. These blocks K are also provided with inwardly-projecting lugs K' to slidably engage the back of the disk H near its rim and guide the same. The sleeve D is also provided with a reduction of its internal diameter at D', which engages a corresponding enlargement of the spindle E, rotative within the sleeve D and having an axial opening in which is inserted a suitable drill G for drilling the center hole in the end of the work. The inner end of this spindle is provided with a suitable tapered opening to receive the tapered rear end of a countersink F, said countersink being also divided longitudinally into two or more parts and provided with an axial opening to receive the drill G and having its tapered outer end screw-threaded to engage corresponding screw-threads in the interior of the spindle E, whereby as it is turned it is drawn into the tapered end of the spindle and caused to firmly grip the drill G, thus operating both as a countersink for countersinking the end of the work and as a chuck for holding the drill. The outer end of the spindle E is suitably countersunk at E' for engagement with the lathe-center. Attached to the spindle is a crank I for operating the same by hand, which crank, when the device is used in a lathe, engages the lathe-bed and holds the spindle from turning.

J is an arm pivoted upon the back of the disk H and adapted to turn down to a position at right angles to the disk and engage the crank I, and when turned inward its movable end rests on the sleeve D.

From the foregoing description the operation of my device will be readily understood. When used as a hand-tool, the jaws A are opened sufficient to receive the end of the work to be centered, the same being done by rotating the disk H by engaging the arm J with the crank I and turning the crank. When the jaws are closed upon the work, the point of the drill is brought opposite the center of the work, when, by disengagement of the arm with the crank, the latter may be rotated freely without turning the chuck. Pressure being applied in any convenient manner to the end of the spindle E to force it inward will enable the operator to properly bore and countersink a suitable center in the work. It is, however, mainly intended to operate the device in a lathe, in which event, after attaching the same to the work, the dead-center of the lathe is inserted in the countersink E' and the crank I allowed to engage the lathe-bed. The spindle will thus be held from rotation, and the work, together with the chuck and sleeve, will rotate. The pressure of the dead-center at E' will force the spindle forward as the drill and countersink penetrates the work.

Having thus fully described my invention, what I claim, and desire to secure by Letters Patent, is—

1. The combination of a chuck, a spindle rotative in the axis of the chuck, a crank and drill attached to the spindle, and means for temporarily connecting the crank and chuck, whereby the chuck is opened or closed by turning the crank, substantially as described.

2. The combination of a scroll-chuck, a sleeve in the axis of the chuck, a spindle rotative in the sleeve and having attached thereto a drill and countersink, a crank attached to the spindle and an arm pivoted to the scroll-disk of the chuck and adapted to engage the crank, substantially as described.

3. The combination of a chuck, a sleeve in the axis of the chuck having a tapered and threaded opening, a tapered, threaded and longitudinally-divided countersink in the sleeve, a drill in the axis of the countersink and held thereby, and a crank attached to the sleeve, substantially as described.

4. The combination of a central hub having radial arms having ways, jaws traversing said ways, a disk rotative on the sleeve and having a scroll engaging teeth on the jaws, removable blocks in the ends of the arms, having inwardly-projecting lugs engaging the disk, a collar on the sleeve engaging the disk, a spindle rotative in the sleeve, a crank attached to the spindle, and a pivoted arm attached to the disk to engage the crank, substantially as described.

In testimony whereof I affix my signature in presence of two witnesses.

WILLIAM L. HAMILTON.

Witnesses:
M. J. CAVANAUGH,
ANDREW DONOVAN.